April 21, 1959

E. S. TAMM 2,883,598

SPEED CONTROL FOR ELECTRIC MOTORS

Filed Jan. 6, 1958

INVENTOR.
Emil S. Tamm
BY
ATTORNEYS.

United States Patent Office 2,883,598
Patented Apr. 21, 1959

2,883,598

SPEED CONTROL FOR ELECTRIC MOTORS

Emil S. Tamm, Elyria, Ohio, assignor to The General Industries Company, Elyria, Ohio, a corporation of Ohio Application January 6, 1958, Serial No. 707,439

10 Claims. (Cl. 318—325)

My invention relates to an electric motor of the type incorporating a centrifugally acted, circuit breaking governor switch for maintaining said motor at a constant, predetermined speed. More particularly my invention pertains to a battery operated motor.

It is an object of my invention to provide an electric motor of the battery operated type wherein speed control under widely varying voltage and load requirements is achieved.

Another object of my invention is to achieve in a motor of the type described constant speed.

A still further object of my invention is to achieve a wider voltage range for constant speed in such a motor.

Yet another object of my invention is to provide a device of the aforesaid type which will maintain a constant speed with a minimum of speed fluctuation.

Another object of my invention is to provide such a device which is simple and economical in construction and highly dependable in use.

Other objects of my invention and the invention itself will become readily apparent from the following description and the appended drawings, in which said drawings.

Figure 1:
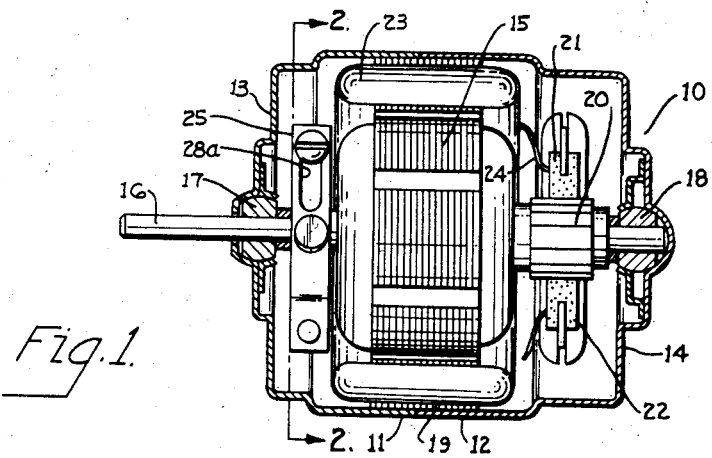
Fig. 1 is a longitudinal section of an electric motor having a centrifugal governor switch mounted therewith.

Referring now to the drawings in all of which like parts are designated by like reference characters, at 10 I show an electric motor encased in complementary housing portions 11 and 12 having end walls 13 and 14 respectively. An armature 15 is unitarily mounted upon a motor shaft 16, said shaft being journaled at one end thereof within a bearing 17 in the end wall 13 and at the other end thereof within a bearing 18 in the end wall 14. The armature 15 rotates in a field 19 mounted within the housing portions 11 and 12.

A commutator 20 is concentrically mounted upon the shaft 16 between the armature 15 and the bearing 18. A pair of brushes 21 and 22 are suitably mounted within the housing portion 12 and are adapted to resiliently contact the commutator 20 in a conventional manner at diametrically opposite points. The brushes 21 and 22 are connected to field coils 23 by wires 24 whereby electrical current is transmitted from a battery or other source of direct current (not shown) to the armature 15.

The speed of the motor 10 is controlled by a centrifugal governor 25 mounted to rotate with the motor shaft 16 intermediate the armature 15 and the bearing 17. The governor 25 comprises a generally rectangular plate 26 having a longitudinally extending stem portion 27. A flat, leaf type spring 28 is suitably secured to the end of the plate 26 opposite the stem 27 by means of a rivet 29, said spring being bent whereby the free end thereof is positioned adjacent said stem. The free end of the spring 28 is provided with an inwardly directed step portion 30 terminating in a foot 31. The spring 28 diverges, therefore, from the plate 26 in the direction of the stem 27, the step portion 30 providing means whereby the foot 31 is positioned adjacent the stem 27.

As shown in Fig. 1, the spring 28 is longitudinally slotted at 28a adjacent the uppermost end of the plate 26. An adjustment screw 32 projects through the slot 28a and is thread-fitted into a laterally stepped, enlarged portion 26a of the plate 26 whereby the rotation of said screw adjusts the tension of the spring 28. By tightening the screw 32, the spring 28 is biased inwardly toward the plate 26 under increased tension; by loosening said screw, the tension is thereby decreased.

A pair of contact points 33 and 34 are rigidly and coaxially mounted upon the stem 27 and the foot 31 respectively. The tension on the spring 28 is adjusted by the adjustment screw 32 whereby the contacts 33 and 34 are normally in resilient abutting relationship.

Figure 2:
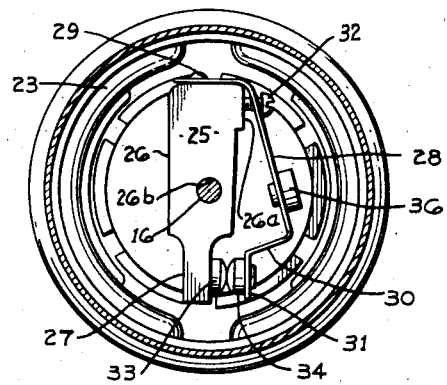
Fig. 2 is a transverse section taken along the line 2—2 of Fig. 1.

A governor weight 36 is rigidly mounted upon the spring 28 intermediate the adjustment screw 32 and the step 30. By referring to Fig. 2, it will be noted that said governor weight is positioned radially outwardly from the center of rotation of the governor 25 and the armature shaft 16.

The above described governor is provided with an aperture 26b in the plate 26 whereby it is telescoped over the shaft 16 and rigidly maintained thereupon in any suitable manner to rotate with said shaft.

When the motor 10 is operating, the contact 34 is subjected to two oppositely acting forces; the tensioned spring 28 urges it inwardly to abut the contact 33 and the centrifugal force effected by the governor weight 36 urges it outwardly away from said contact 33. By proper adjustment of the screw 32, the governor contacts 33 and 34 separate at a predetermined rate of rotation. The opening of the contacts 33 and 34 deenergizes the armature 15, in a manner to be herein later more fully described, thereby controlling the maximum speed of the motor 10.

Figure 3:
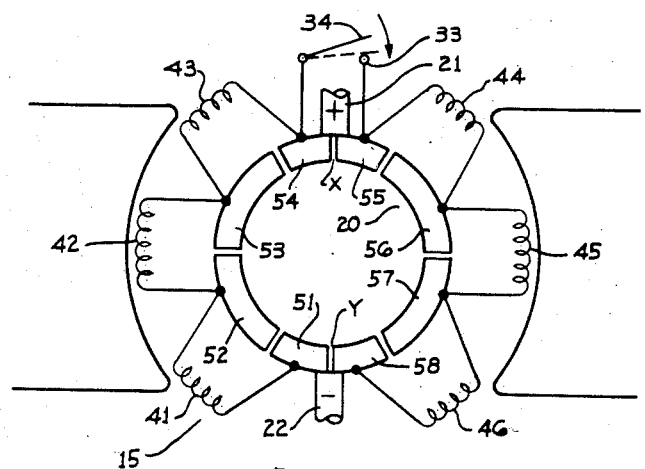
Fig. 3 is a diagrammatical view of the armature circuit of my invention.

Referring now to the diagrammatical showing of Fig. 3, the armature 15 preferably comprises an even number of coils, and in the form shown, six coils are designated in circumferential succession by the numerals 41, 42, 43, 44, 45 and 46. The commutator 20 comprises two more bars than the number of coils, viz. eight bars designated by reference numerals 51, 52, 53, 54, 55, 56, 57, and 58. The commutator bars 52, 53, 56 and 57 each preferably span substantially 60° of arc whereas the bars 51, 54, 55, 58 each preferably span substantially 30 degrees of arc. Each of the armature coils is electrically connected to two adjacent commutator bars, the arrangement being as follows:

Coil 41 is connected to bars 51 and 52,
Coil 42 is connected to bars 52 and 53,
Coil 43 is connected to bars 53 and 54,
Coil 44 is connected to bars 55 and 56,
Coil 45 is connected to bars 56 and 57, and
Coil 46 is connected to bars 57 and 58.

The governor 25 provides electrical contact between the bars 54 and 55, and the bars 51 and 58 remain open except during the times they are short-circuited or spanned by one of the brushes 21 or 22.

At any speed below the pre-determined governed speed, the governor contacts 33 and 34 are closed and the open circuit between the bars 51 and 58 causes first one of the two paths between the brushes 21 and 22 to be opened during a first half revolution, and on the next half revolution, the other path to be opened. Thus it will be understood that only one half of the coils carry current during normal operation of the motor except for the brief instant during which a brush straddles the bars 51 and 58, and simultaneously the bars 54 and 55, or twice in each complete revolution all of the coils simultaneously carry the current. In my invention, the current carried by each path is carried for the same angle of rotation.

When the motor 10 attains a speed above the governed speed, the governor contacts are opened, and there are two diametrically oppositely spaced open circuit positions on the commutator 20. Above governed speed, therefore, all of the armature coils 41, 42, 43, 44, 45, and 46 are deenergized to effect reduction in speed except during the instant when the brushes 21 and 22 bridge the commutator bars 54—55 and 51—58, or twice in each rotation of the armature 15. At such times, all of said armature coils are momentarily energized.

The angle of rotation during which the above described brief complete energization takes place depends upon the width of the brushes and the arc spanned thereby. It is obvious that such angle of rotation should be relatively small so that such momentary energization should not result in speeds above the governed speed and since the coils are open circuited for a greater portion of each revolution, a greater voltage range for constant speed results.

In the illustrated embodiment, if the brushes 21 and 22 each span 20° of arc and the commutator slots each span 8° of arc, the angle during which said brushes bridge the open circuited commutator bars is 12° of rotation, and this, then, is the small angle through which the armature passes current to all of its coils and transmits torque at a speed just above governed speed.

Due to the fact that all of the armature coils are controlled by a single set of governor contacts, it will be readily understood that quite a broad range of motor load can be satisfactorily controlled by my device.

During normal operation of the motor, when the governor contacts are closed, one half of the coils are energized through one of the paths during one half revolution of the armature and the other half energized through the other path except when the brushes short circuit the current by passing over the diametrically oppositely positioned open slots "x" and "y" when all of the coils simultaneously and momentarily carry the current which achieves the important result of eliminating abrupt speed changes since the armature is, during each complete revolution, subject to energization whether the governor contacts are opened or closed. Thus variations in voltages or in load are controlled and constant speed achieved and severe fluctuations eliminated which would be harmful in the case of, for example, battery operated motors for phonograph drives.

Although, I have described my invention in connection with a preferred embodiment, I am aware that numerous and extensive departures may be made therefrom, without however departing from the spirit of my invention and the scope of the appended claims.

What I claim is:

1. An electric motor having a circuit breaking governor switch mounted thereon, said motor having an armature including armature windings divided into two sections, two groups of commutator bars provided with open circuit positions therebetween, each of said groups of bars being connected in series with one of said sections of armature windings, a pair of commutator brushes adapted to bridge said open circuit positions simultaneously to briefly energize both of said sections of armature windings during rotation of said armature, and said governor switch being connected in series across one of said open circuit positions.

2. An electric motor having a centrifugally actuated circuit breaking governor switch mounted thereon, said motor having an armature including armature windings divided into two sections comprising equal numbers of windings, a plurality of commutator bars comprising two groups of bars having two open circuit positions therebetween and comprising equal numbers of bars, each of said groups of commutator bars being connected in series with one of said sections of windings, a pair of commutator brushes adapted to bridge said open circuit positions simultaneously to briefly energize both of said sections of armature windings during rotation of said armature, and said governor switch being connected in series across one of said open circuit positions.

3. An electric motor having a circuit breaking governor switch, said motor having an armature including armature windings divided into two sections, two groups of commutator bars provided with two open circuit positions therebetween, said governor switch being connected in series across one of said open circuit positions, each of said groups of bars beings connected in series with one of said sections of armature windings, a pair of commutator brushes adapted to bridge both of said open circuit positions simultaneously twice during each revolution of said armature to briefly energize both of said sections of armature windings, said brushes adapted to energize one-half of said armature windings when said brushes do not bridge said open circuit positions and said governor switch is closed.

4. An electric motor having a circuit breaking governor switch, said motor having an armature including armature windings divided into two sections, two groups of commutator bars provided with two open circuit positions therebetween, said governor switch being connected in series across one of said open circuit positions, each of said groups of bars being connected in series with one of said sections of armature windings, a pair of commutator brushes adapted to bridge both of said open circuit positions simultaneously twice during each revolution of said armature to briefly energize both of said sections of armature windings, and all of said armature windings being de-energized when said brushes do not bridge said open circuit positions and said governor switch is open.

5. An electric motor having a circuit breaking governor switch mounted thereon, said motor having an armature including armature windings divided into two sections, two groups of commutator bars provided with two diametrically opposite open circuit positions therebetween, said governor switch being conected in series across one of said open circuit positions, each of said groups of bars being connected in series with one of said sections of armature windings, a pair of diametrically oppositely positioned commutator brushes adapted to bridge said open circuit positions simultaneously to briefly energize both of said sections of armature windings twice during each rotation of said armature.

6. An electric motor having an armature including armature windings divided into two sections, a centrifugally actuated, circuit breaking governor switch mounted upon said armature to rotate therewith, said governor switch having a pair of normally closed contacts adapted to open at a predetermined rate of rotation of said armature, two groups of commutator bars provided with open circuit positions therebetween, each of said groups of bars being connected in series with one of said sections of armature windings, a pair of commutator brushes adapted to bridge said open circuit positions simultaneously to briefly energize both of said sections of armature windings during rotation of said armature, and said governor switch being connected in series across one of said open circuit positions.

7. An electric motor having an armature including armature windings divided into two sections, a centrifugally actuated, circuit breaking governor switch mounted upon said armature to rotate therewith, said governor switch having a pair of normally closed contacts adapted to open at a predetermined rate of rotation of said armature, two groups of commutator bars provided with two diametrically opposite open circuit positions therebetween, each of said groups of bars being connected in series with one of said sections of armature windings, a pair of diametrically oppositely positioned commutator brushes adapted to bridge said open circuit positions simultaneously to briefly energize both of said sections of armature twice during each revolution of said armature, and said governor switch being connected in series across one of said open circuit positions.

8. An electric motor having a circuit breaking governor switch mounted thereon, said motor having an armature including armature windings divided into two sections, two groups of commutator bars provided with open circuit positions therebetween, the total number of said commutator bars exceeding the total number of armature coils by two bars, each of said groups of bars being connected in series with one of said sections of armature windings, a pair of commutator brushes adapted to bridge said open circuit positions simultaneously to briefly energize both of said sections of armature windings during rotation of said armature, and said governor switch being connected in series across one of said open circuit positions.

9. An electric motor having an armature including armature windings divided into two sections, a centrifugally actuated, circuit breaking governor switch mounted upon said armature to rotate therewith, said governor switch having a pair of normally closed contacts adapted to open at a predetermined rate of rotation of said armature, two groups of commutator bars provided with two open circuit positions therebetween, the total number of said commutator bars exceeding the total number of armature coils by two bars, each of said groups of bars being connected in series with one of said sections of armature windings, a pair of commutator brushes adapted to bridge said open circuit positions simultaneously to briefly energize both of said sections of armature windings during rotation of said armature, and said governor switch being connected in series across one of said open circuit positions.

10. An electric motor having an armature including in even number of armature windings divided into two sections, each of said sections comprising the same number of coils as the other of said sections, a centrifugally actuated, circuit breaking governor switch mounted upon said armature to rotate therewith, said governor switch having a pair of normally closed contacts adapted to open at a predetermined rate of rotation of said armature, a commutator including an even number of commutator bars divided into two groups, each of said groups of bars comprising the same number of bars as the other of said groups, said groups of commutator bars having two diametrically opposite open circuit positions therebetween, the total number of commutator bars exceeding the total number of armature windings by two bars, each of said groups of bars being connected in series with one of said sections of armature windings, a pair of diametrically oppositely positioned commutator brushes adapted to bridge said open circuit positions simultaneously to briefly energize both of said sections of armature twice during each revolution of said armature and to energize one-half of said armature coils when not bridging said open circuit positions and when said governor contacts are closed, and said governor switch being connected in series across one of said open circuit positions.

No references cited.